United States Patent [19]
Dynys et al.

[11] Patent Number: 5,569,970
[45] Date of Patent: Oct. 29, 1996

[54] TANTALA-SILICA INTERFERENCE FILTERS AND LAMPS USING SAME

[75] Inventors: Frederick W. Dynys, Chagrin Falls; Thomas G. Parham, Gates Mills, both of Ohio

[73] Assignee: General Electric Company, Schenectady, N.Y.

[21] Appl. No.: 409,734

[22] Filed: Mar. 23, 1995

Related U.S. Application Data

[63] Continuation of Ser. No. 978,007, Nov. 18, 1992, Pat. No. 5,422,534.

[51] Int. Cl.$^6$ .................................................... H01J 61/40
[52] U.S. Cl. ........................... 313/112; 313/635; 359/339
[58] Field of Search ...................................... 313/110, 111, 313/112, 580, 635; 359/589, 588, 586, 359

[56] References Cited

U.S. PATENT DOCUMENTS

| | | |
|---|---|---|
| 3,168,670 | 2/1965 | Levand, Jr. . |
| 4,211,803 | 7/1980 | Cowher et al. . |
| 4,393,097 | 7/1983 | Hirai et al. . |
| 4,435,445 | 3/1984 | Allred et al. . |
| 4,508,054 | 4/1985 | Baumberger et al. . |
| 4,565,747 | 1/1986 | Nakae et al. . |
| 4,588,923 | 5/1986 | Hoegler et al. . |
| 4,663,557 | 5/1987 | Martin, Jr. et al. . |
| 4,689,519 | 8/1987 | Ooms et al. . |
| 4,734,614 | 3/1988 | Kuus . |
| 4,775,203 | 10/1988 | Vakil et al. . |
| 4,940,636 | 7/1990 | Brock et al. . |
| 4,949,005 | 8/1990 | Parham et al. . |
| 4,983,001 | 1/1991 | Hagiuda et al. . |
| 5,075,451 | 12/1991 | Iida et al. . |
| 5,179,318 | 1/1993 | Maeda et al. . |

FOREIGN PATENT DOCUMENTS 60-130704  7/1985  Japan .

*Primary Examiner*—Sandra L. O'Shea
*Assistant Examiner*—Vip Patel
*Attorney, Agent, or Firm*—George E. Hawranko; Stanley C. Corwin

[57] ABSTRACT

An optical interference filter produced on a vitreous, light transmissive substrate, such as an electric lamp envelope, includes a plurality of alternating layers of tantala and silica in which each tantala layer includes titania in an amount of less than about 10 mole % whereby the microstructure of the tantala layers is controlled during subsequent crystallization and extrinsic stress in the tantala layers is reduced. Rather than or in addition to including titania in each tantala layer, the present invention additionally contemplates placing at least some of the tantala layers in contact with a titania layer (pre-layer and/or post-layer) whereby the microstructure of the tantala layers is controlled during subsequent crystallization and extrinsic stress in the tantala layers is reduced. The optical interference filters are produced by a process comprising depositing a plurality of alternating layers of tantala and silica on a vitreous, light transmissive substrate from respective precursors thereof by CVD, preferably LPCVD, to form a coated substrate. The filter may then be heated for a time and to a temperature effective to crystallize the tantala, preferably to a temperature ranging from about 550° to about 800° C. and holding same within that temperature range for at least about one hour.

5 Claims, 5 Drawing Sheets

TANTALA-SILICA INTERFERENCE FILTERS AND LAMPS USING SAME

This application is continuation of Ser. No. 07/998,007, filing date Nov. 18, 1992, now U.S. Pat. No. 5,422,534.

BACKGROUND OF THE INVENTION

1. Field of the Invention

This invention relates to optical interference filters made of alternating layers of tantala and silica and their use on lamps. More particularly, this invention relates to optical interference filters made of alternating layers of tantala and silica in which subsequent extrinsic stress in the tantala layer due to crystallization is reduced by doping the tantala with titania and/or contacting the tantala layer with a layer of titania, and the use of such filters on electric lamps.

2. Background of the Art

Thin film optical coatings known as interference filters which comprise alternating layers of two or more materials of different indices of refraction are well known to those skilled in the art. Such optical coatings are used to selectively reflect or transmit light radiation from various portions of the electromagnetic spectrum and are used in the lamp industry to coat reflectors and lamp envelopes.

Interference filters to be used for applications where the filters will be exposed to high temperatures in excess of about 500° C. have been made of alternating layers of tantala (tantalum pentoxide, $Ta_2O_5$) and silica ($SiO_2$), wherein the silica is the low refractive index material and the tantala is the high refractive index material. Such filters and lamps employing same are disclosed, for example, in U.S. Pat. Nos. 4,949,005; 4,689,519; 4,663,557; and 4,588,923, the disclosures of which are herein incorporated by reference.

The problem of severe stress formation associated with the use of interference filters consisting of alternating layers of silica and tantala when employed at high temperatures was recognized in U.S. Pat. No. 4,734,614, the disclosure of which is herein incorporated by reference. This patent teaches that tantala has limited physical and chemical stability, and crystallizes to a polycrystalline form after about 30 minutes at 800° C. which produces stress cracks visible as craquele. This results in a filter that scatters both visible and infrared radiation, thereby rendering it unsuitable for its intended purpose.

Responsive to the need for a process which would apply a relatively uniform coating to a complex shape and which would not result in a film containing such stresses that the film cracks and peels off the substrate, U.S. Pat. No. 4,949,005 to coinventor herein, T. Parham et al., provides an interference filter thin film optical coating consisting essentially of alternating layers of tantala and silica having relatively low light scattering which is suitable for use at high temperatures. The coatings are obtained by employing a chemical vapor-deposition (CVD) process and, preferably, a low pressure chemical vapor deposition (LPCVD) process to produce the coatings on a suitable substrate, such as quartz. After application of the alternating layers, the optical filter produced is annealed to avoid catastrophic extrinsic stress formation from volume changes due to crystallization of tantala at temperatures above about 600° C. which cause cracking and buckling and result in poor adhesion, peeling, and undesirable optical scattering of light. Thus, the coated substrate must be heated to a temperature of between about 550° to 675° C., and held within this temperature range for a period of from about 0.5 to 5 hours.

Despite advances in the art, however, the need to anneal subsequent to deposition in order to reduce stress continues to be mandatory and increases the cost and time required for manufacturing interference filters and articles, such as lamps, including these interference filters.

Accordingly, it is an object of the present invention to provide a tantala-silica optical interference filter in which the extrinsic stress of the tantala layer is reduced so that the need for post-deposition annealing is reduced and, when combined with an annealing treatment, for example, to relieve stress in the silica layers, produces filters having reduced stress-related damage.

It is another object of the present invention to provide a low stress tantala-silica optical interference filter produced by a CVD or LPCVD process.

It is yet another object of the present invention to provide a lamp including a low stress tantala-silica optical interference filter so that the energy efficiency of the lamp is improved.

SUMMARY OF THE INVENTION

These and other objects are accomplished by providing an optical interference filter comprising a vitreous, light transmissive substrate; and alternating layers of tantala and silica in which each tantala layer includes titania in an amount of less than about 10 mole percent. Inclusion of titania dopant controls the microstructure of the tantala layers during subsequent crystallization and thereby reduces extrinsic stress in the tantala layers. Rather than or in addition to doping each tantala layer with titania, the present invention additionally contemplates providing a titania layer in contact with at least some tantala layers, that is, providing a pre-layer and/or a post-layer of titania. As with titania doping, contacting a tantala layer with titania layers is also effective to control the micro- structure of the tantala layer during subsequent crystallization by heating of the film and to thereby reduce extrinsic stress in the tantala layers.

The present invention additionally provides an electric lamp, comprising a light transmissive vitreous envelope enclosing an electric light source; and an optical interference filter according to the invention as described in the foregoing.

The interference filters according to the present invention are preferably provided by a CVD process, most preferably by an LPCVD process, the process comprising depositing a plurality of alternating layers of tantala and silica on a vitreous, light transmissive substrate by CVD, preferably LPCVD, from respective precursors to form a coated substrate, each tantala layer comprising titania in an amount of less than about 10 mole percent. In embodiments of the invention in which titania pre-layers and/or post-layers are employed instead of or in addition to titania doped tantala layers, the process includes depositing a titania layer before or after deposition of at least some tantala layers. If an optical interference filter according to the invention is to be used at a temperature exceeding 650° C., it is preferable to anneal the coated substrate for a time and at a temperature effective to crystallize the tantala. Most preferably the coated substrate is held at a temperature ranging from about 550° to about 800° C. for at least about one hour whereby the tantala crystallizes. Most preferably the coated substrate is held at about 650° C. for about two hours. At a temperature ranging from about 650° to about 675° C., the tantala crystallizes within about one to two hours after which no further crystallization occurs even with prolonged heating.

The present invention additionally provides, as a composition of matter, a vitreous, light transmissive substrate supporting an optical interference filter comprising a plurality of alternating layers of tantala and silica in which each tantala layer comprises titania in an amount of less than about 10 mole percent and/or in which at least some tantala layers are in contact with a titania layer (pre-layer and/or post-layer).

DETAILED DESCRIPTION OF THE PREFERRED EMBODIMENTS

Figure 1:
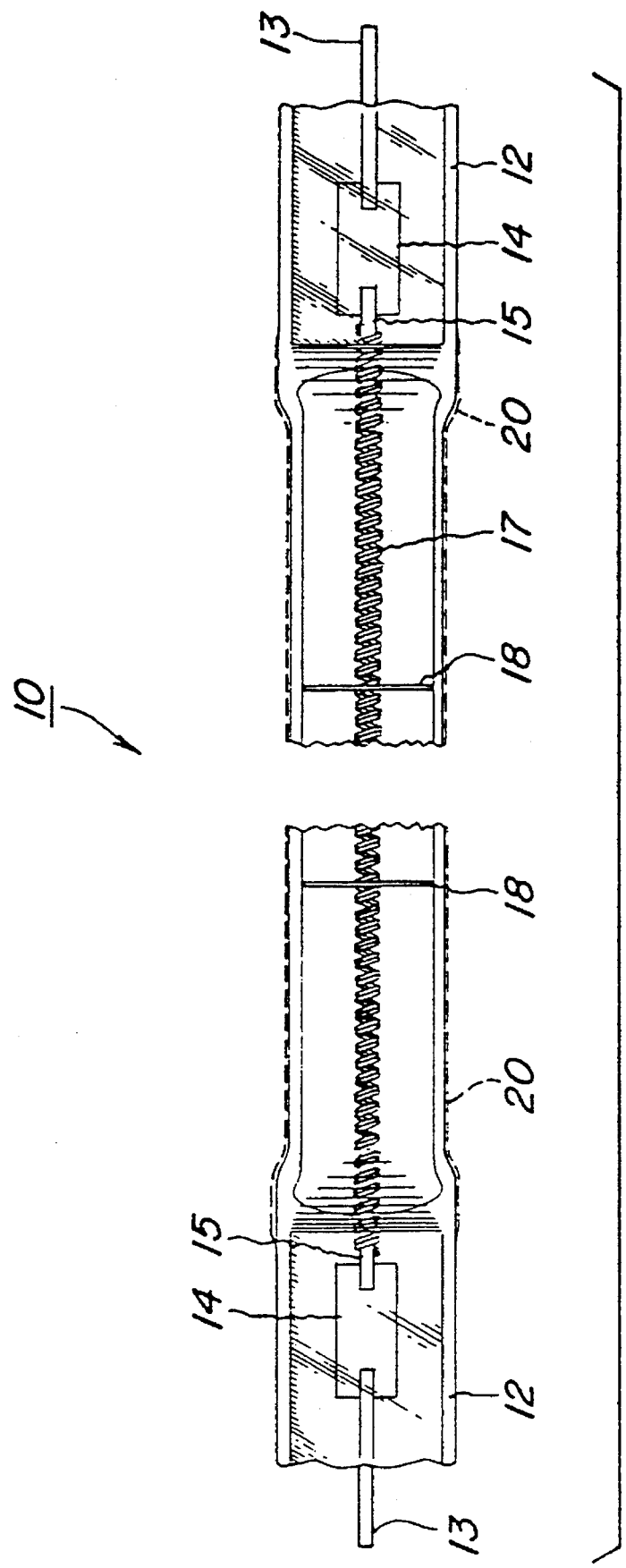
FIG. 1 is a side view of an elongated tungsten halogen lamp having an optical interference film according to the present invention provided on its outer surface.

The total stress of the optical interference film is the sum of three independent stresses, namely, thermal stress, intrinsic stress, and extrinsic stress. Thermal stress is a fixed stress that results from the thermal expansion mismatch between the substrate and the film. Intrinsic and extrinsic stresses are process dependent. Intrinsic stress arises from disorder in bond lengths and angles during film deposition. Extrinsic stress results from the crystallization of a previously amorphous material which produces a volume change, for example, crystallization of tantala from amorphous tantala at temperatures above about 600° C. The volume change during crystallization produces extrinsic stress which causes film cracking and buckling which produces sites for undesirable optical scattering of light and reduces the strength of the substrate.

The invention provides tantala layers in optical interference filters having reduced extrinsic stress by doping the tantala with titania and/or providing tantala in contact with a titania layer as a pre-layer and/or as a post-layer. Thus, subsequent crystallization of the amorphous tantala layers in filters according to the invention results in a much more highly ordered crystalline tantala than would otherwise be obtained. The tantala layers according to the invention have finer grain structures and less microcracking, and the inventive methods and optical interference filters produced by these methods have reduced optical losses due to optical scattering.

Single layers of tantala doped with titania were prepared by several CVD methods-and it was found that the tantala microstructure was dependent upon the titania concentration. In a first CVD method, titania doping was achieved by mixing, in the gas phase, vapors of titanium isobutoxide and tantalum ethoxide. In a second CVD method, titania doping was achieved by mixing liquid titanium ethoxide and liquid tantalum ethoxide, and evaporating the liquid mixture into the gas phase. In both methods, the tantala produced is amorphous and subsequent crystallization of the amorphous tantala by heating was found to be characterized by nucleation of a finer grain structure than in an undoped tantala film. This is what is meant by the statement that inclusion of titania "controls" the microstructure of the doped tantala layer during subsequent crystallization.

Thus, for example, when tantalum ethoxide and titanium isobutoxide were separately vaporized into a reactor, and the gas phase compositions were varied to contain from 0% to 35 mole % titanium, films made to contain titania in an amount of less than about 10 mole %, preferably from about 0.1 to about 2 mole %, had significantly improved microstructure after crystallization, while films with a high titania content (10 or more mole %) were foggy, i.e., demonstrated undesirable optical scattering. Thus, too high a level of titania doping creates a poor quality film, presumably due to formation of an undesirable phase. Scanning electron microscope (SEM) photographs of titania doped films after a 15 hour heat treatment at 650° C. demonstrated that films with 1 to 2 mole % titania showed significantly reduced microcracking and less optical scattering. X-ray diffraction (XRD) measurements of some of these films showed that films containing small amounts of titania are much more highly ordered than pure tantala films, i.e., have much higher peak intensity. Similar results were obtained by premixing tantalum ethoxide with titanium ethoxide, and then injecting and vaporizing the premixed reagents in the deposition chamber.

SEM photographs of a single layer of tantala (undoped) that had been heated at 800° C. for 24 hours revealed a uniform grain size of about 1 micron. Similar photographs for tantala doped with 1% titania show a bimodal distribution of grain sizes; that is, grains of about 0.5 microns and grains of about 1 micron in size were noted. Moreover, while the undoped tantala film had a high density of microcracks, the doped film had an advantageously reduced level of microcracking. XRD patterns for these two materials showed that tantala with 1 mole % titania crystallized into a highly ordered structure. Therefore, the doping level of titania in tantala is any amount effective to control the microstructure of the tantala layers during subsequent crystallization, generally an amount of less than about 10 mole %. The beneficial doping therefore ranges from about 0.001 to less than about 10 mole % titania in tantala, and most preferably from about 0.1 to about 2 mole %.

Improved tantala microstructure may additionally be obtained by providing a thin layer of titania adjacent to the tantala layer. Thus, a pre-layer of tantala may be deposited onto a thin layer of titania and/or a thin titania post-layer may be deposited onto a layer of tantala. For example, a pre-layer of titania having a thickness of about 130 Å was deposited by CVD from titanium ethoxide followed by deposition of tantala thereover. The titania deposited in such a manner was found to be composed of extremely small microcrystallites of anatase having a size of about 300 Å.

It has been found that the use of an adjacent layer of titania in contact with an amorphous layer of tantala is effective to nucleate a finer grain structure in the tantala when the tantala is later crystallized. This result was confirmed by an SEM study of such a titania/tantala bilayer and showed a remarkable transformation in the microstructure of the crystallized tantala. The crystallized tantala was composed of very small grains ranging in size from about 0.3 to 0.6 microns. The XRD pattern showed that this tantala had essentially the same advantageous structure after crystallization as a tantala layer doped with 1 mole % titania. That is, the tantala was crystallized in a highly ordered manner. These advantageous results, moreover, continued even when the bilayers were heated to lamp operating temperatures ranging between about 650°–900° C.

The amount of titania dopant in a tantala film has been found to be somewhat independent of the amount of titania in the vapor phase for LPCVD deposition at low amounts of titania precursor. Thus, it has been noted that the amount of titania in a titania doped tantala film is not the same as the amount of titania precursor in the mixed titania/tantala precursor gas atmosphere during the LPCVD deposition process.

The adjacent titania layer, moreover, should be substantially thinner than the tantala layer. By way of example but not limitation, the tantala layer will generally be at least about 500 Å thick, whereas the pre-deposited and/or post-de-posited titania layer contacting the tantala layer will generally range from between about 50–150 Å thick. Of course there may be exceptions where the tantala will be less than 500 Å, but the goal is to keep the titania layer thin enough to obtain the desired morphology when the tantala subsequently crystallizes, while not being so thick as to unduly interfere with optical properties and make the film design unduly complex. This is because titania has a high coefficient of thermal expansion which results in thermal stress. Moreover, when single layers of titania are heated above about 900° C. conversion from anatase to rutile titania occurs and the film becomes hazy.

Turning now to the drawings, FIG. 1 illustrates a lamp the outer surface of which is provided with a tantala-silica interference filter according to the present invention which reflects infrared radiation back to the filament where it is converted into visible radiation. This lamp is illustrative but is not intended to limit the present invention.

The lamp illustrated in FIG. 1 comprises envelope 10 made out of a vitreous, light transmissive material capable of withstanding high temperatures of at least about 800° C. such as quartz. Each end of envelope 10 has a pinch seal portion 12 through which is sealed an inlead connector 13 electrically and mechanically attached by suitable means, such as welding, to molybdenum foil 14 which is hermetically sealed and embedded in the pinch seal portion 12 of the lamp. Leads 15 made out of a suitable refractory-metal, such as molybdenum or tungsten, are attached to the other end of molybdenum foils 14 at one end and at the other end are connected to tungsten filament 17 which is supported on its axis within the envelope by a plurality of suitable supporting members 18, such as tungsten spiral wire supports of the type disclosed in U.S. Pat. No. 3,168,670. Thin film optical interference filter 20 of the present invention is provided on the outer surface of the lamp as a continuous coating.

Film 20 consists of alternating layers of tantala and silica arranged so as to adjust the pass-band and the stop-band characteristics of the emitted radiation of the lamp. The tantala layers are doped with titania and/or are adjacent a titania pre-layer and/or post-layer according to the invention. The total number of combined layers of silica and tantala is ideally as large as possible to obtain maximum optical performance, however, stress considerations must be balanced with optical performance The total number therefore preferably ranges from 8 to 100. Stress considerations become a factor as 20 layers are reached, particularly as 60 layers are reached.

In one embodiment, interference film 20 will reflect the infrared radiation emitted by tungsten filament 17 back to the filament, while transmitting the visible radiation. Alternatively, the interference film comprising the alternating layers of tantala and silica may be designed in the known manner to reflect visible radiation while transmitting infrared radiation. In yet another embodiment, film 20 can be designed so as to transmit radiation within a particular region of the electromagnetic spectrum, while reflecting that light which it is desired not be transmitted.

FIGS. 2 through 6 are SEM photographs which show tantala layers which are undoped, which are doped with titania, and which are undoped but have an adjacent titania layer. These layers, were prepared by an LPCVD process using tantalum ethoxide and titanium ethoxide or titanium isobutoxide.

Figure 2:
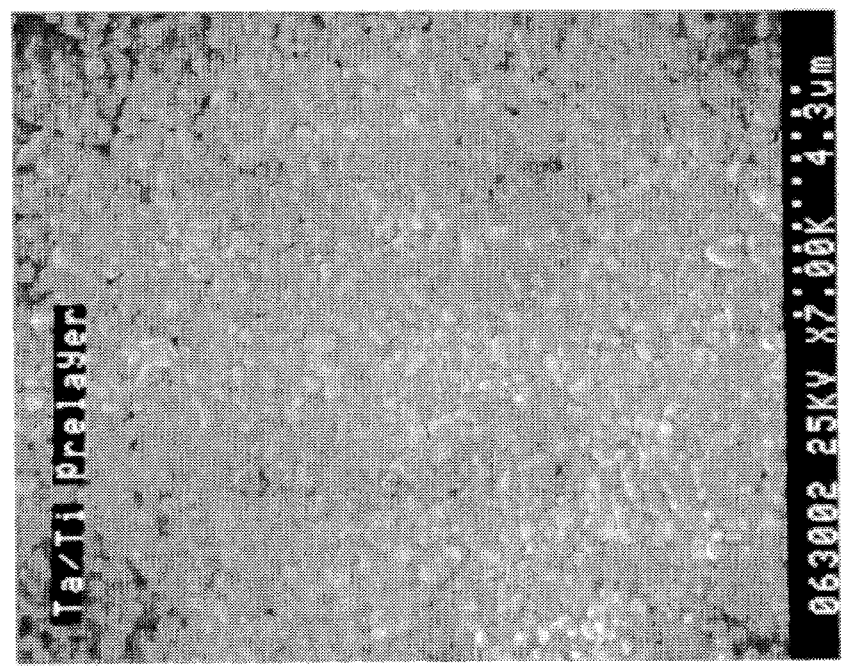
FIG. 2 is an SEM photograph of a tantala film with a titania pre-layer according to the invention at 71,000× magnification.

FIG. 2 shows a tantala film provided on a titania pre-layer at 7,000× magnification. The titania pre-layer had a thickness of 130 Å and the total film thickness was 3,800 Å. The sample was rapidly heated to 850° C. in air and was held at that temperature for 24 hours as a torture test.

Figure 3:
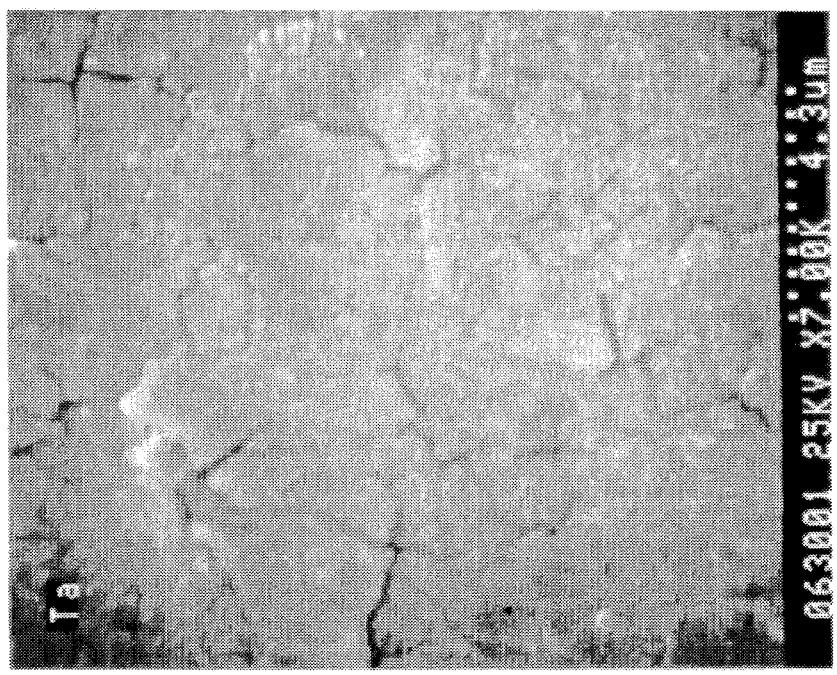
FIG. 3 is an SEM photograph of a tantala film with no titania pre-layer at 7,000× magnification for comparison with FIG. 2.

FIG. 3 shows a tantala film without any titania pre-layer at 7,000 × magnification. The tantala film had a thickness of 2,900 Å and was made for comparison with FIG. 2. Cracking and buckling is seen. A comparison of FIGS. 2 and 3 clearly shows the provision of a titania pre-layer according to the invention advantageously resulted in much smaller crystallinity in the adjacent tantala layer compared to the tantala layer which didn't have an adjacent titania layer.

Figure 4:
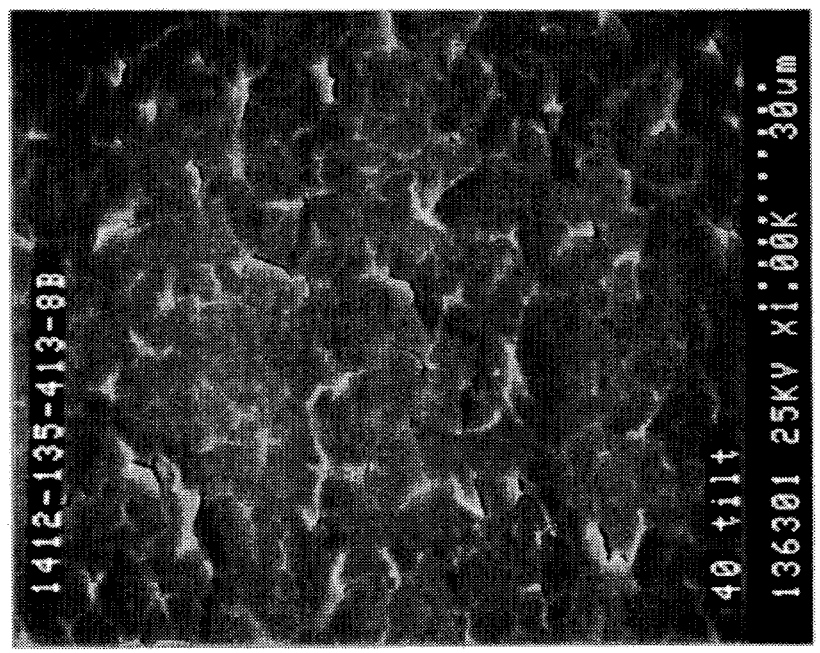
FIG. 4 is an SEM photograph of a tantala film including 10 mole % titania according to the invention at 1,000× magnification.

FIG. 4 is an SEM photograph of a tantala layer including 10 mole percent titania at 1,000× magnification. The sample was rapidly heated in air to 650° C. and maintained at that temperature for 15 hours. Cracking and buckling is seen.

Figure 5:
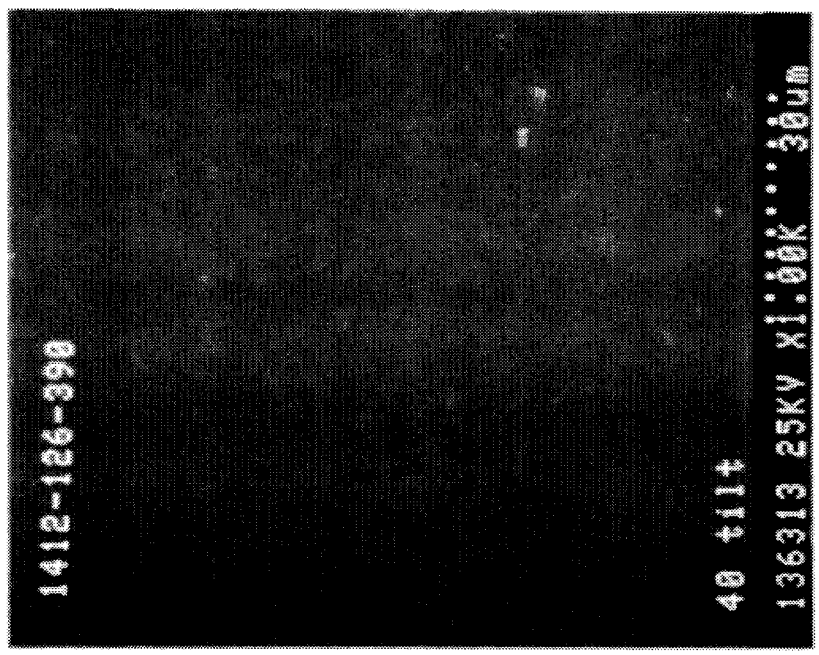
FIG. 5 is an SEM photograph of a tantala film including 1 mole % of titania according to the invention at 1,000× magnification.

FIGS. 5 is an SEM photograph showing a tantala layer including somewhat less than 1 mole percent titania at a magnification of 1,000×. The sample was rapidly heated in air to 650° C. and maintained at that temperature for 15 hours. The sample is virtually crack free.

Figure 6:
FIG. 6 is an SEM photograph of a tantala film with no titania included at 1,000× magnification for comparison with FIGS. 4 and 5.

FIG. 6 is an SEM photograph of a tantala layer without any titania at a magnification of 1,000×. The sample was rapidly heated in air to 650° C. and maintained at that temperature for 15 hours. One can readily see-severe cracking and buckling, and areas where the tantala is missing due to spallation. This tantala layer was made for comparison with the tantala layers including titania shown in FIGS. 4 and 5. Almost no lifting is visible in FIG. 5 for the inventive tantala sample including somewhat less than 1 mole percent titania.

X-ray diffraction (XRD) studies of tantala layers produced according to the invention showed broad peaks of low intensity despite a grain structure having crystallites of 1–2 µm in size. This broadening in the XRD pattern is believed to be due to internal stresses in the film and/or crystalline imperfections, both of which are undesirable in films for optical applications. They create a weaker film having a greater tendency to separate at grain boundaries. Such films apply more stress to the substrate, increasing spallation and lifting of the film from the substrate. Both lifting and spallation of the film undesirably reduce the optical reflectance of the film and increase optical scattering.

A severe test for spallation for single layer tantala films and for multilayer tantala/silica films is to rapidly heat same above 800° C. The resulting film crack pattern of such rapidly heated samples was observed using scanning electron microscopy (SEM). The so-produced cracking/lifting of tantala results from the nucleation and growth of crystalline tantala from the amorphous phase. SEM studies of pure tantala layers showed film cracking and lifting of the cracked edges away from the quartz substrate. The deposition of tantala over a 130 Å titania film dramatically eliminates film cracking/lifting upon crystallization of tantala as shown in FIG. 2. The titania layer is composed of sub-micron grains of anatase. The grain size of the tantala film (with titania pre-layer) is sub-micron and, as set forth above, it is reduced,by a factor of about 3, i.e., from 1–2 μm to 0.3–0.6 μm, compared to an undoped tantala layer crystallized without an adjacent titania layer as shown in FIG. 3. The reduction in grain size makes it apparent that the titania layer enhances the nucleation frequency of tantala grains. Doping tantala with small amounts of less than about 10 mole % of titania was also found to be effective in reducing film cracking and lifting. Doping tantala with even less than 1 mole % titania reduces film cracking and lifting as shown in FIG. 5. The 40 degree tilt also shows a reduction in the height of lifted film edges. In summary, therefore, film cracking and lifting can be controlled by depositing tantala over or under a thin titania layer having a thickness ranging from about 50 to about 500 Å, preferably from about 50 to about 150 Å, or by doping the tantala with less than. 10 mole % titania.

Figure 7:
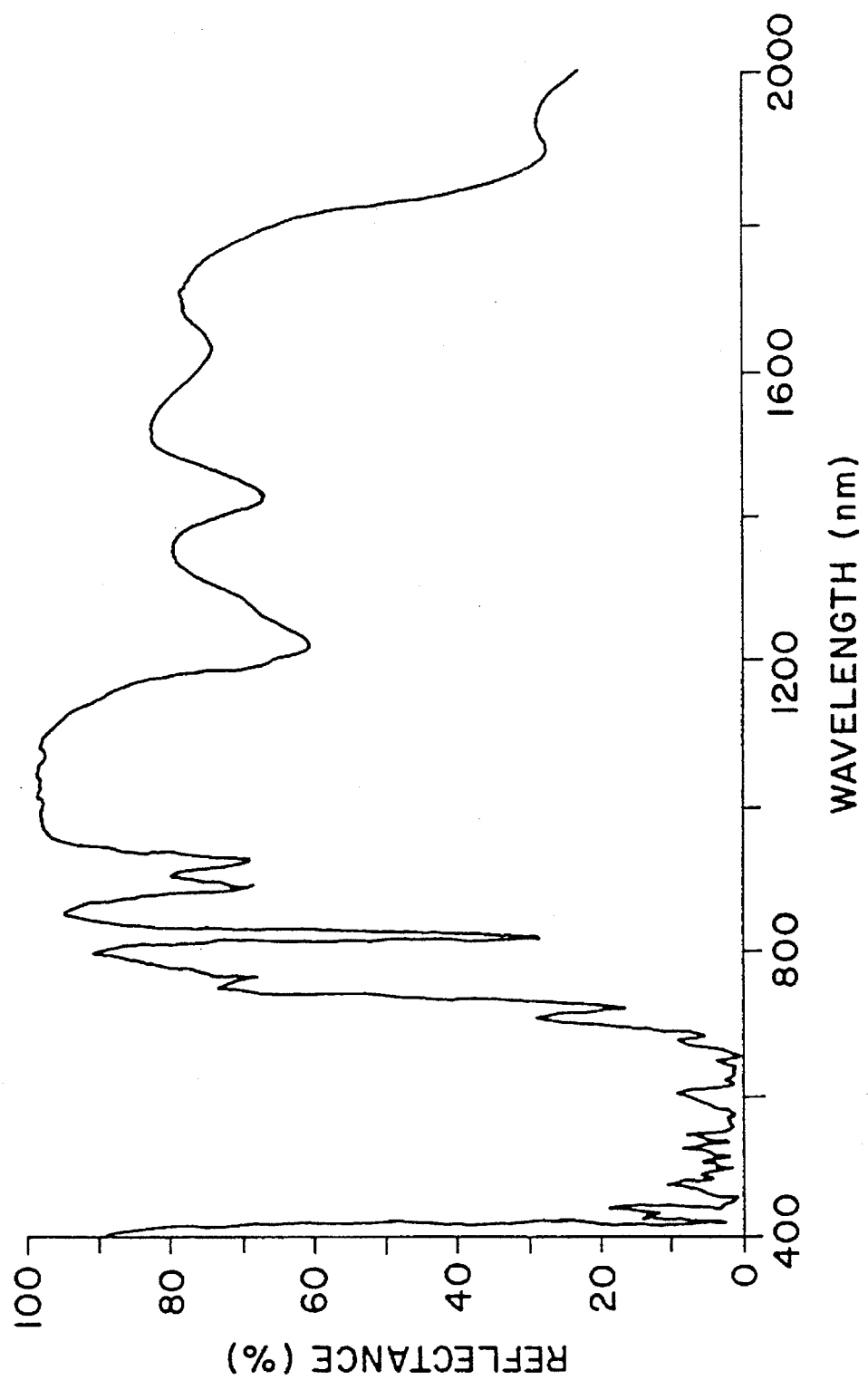
FIG. 7 is a computed reflectance spectrum of a tantala/silica IR reflecting filter with titania pre-layers according to the present invention.

FIG. 7 is a computed reflectance spectrum of a further example of an interference filter according to the present invention. The interference filter is a tantala/silica IR reflecting filter with titania pre-layers and has a total of 35 layers. FILM*STAR™ software for multilayer optical coatings was employed starting with a conventional 24 layer design interference filter having alternating layers of tantala and silica (12 layers of each), most of the tantala layers being preceded by and in contact with a thin layer of titania. The tantala film thicknesses were reduced in view of the titania layers and the design was reoptimized. In this particular design it was found advantageous to omit a titania layer before tantala layer 28.

As mentioned in U.S. Pat. No. 5,138,219, column 7, lines 53–63, there are a large number of computer programs commercially available for optimizing multilayer coatings and one such list of some fifteen vendors and programs may be found on page 144 of the September, 1988 issue of *PHOTONICS SPECTRA* magazine, an optics industry trade journal. Included in this list as illustrative, but nonlimiting examples, are CAMS which is available from Optikos located at 143 Albany Street, Cambridge, Mass. 02139, and FILM*STAR™ available from FTG Software Associates at P.O. Box 579, Princeton, N.J. 08524.

The following is a list of the 35 layers of the interference filter of FIG. 7. The high refractive index material, H, is tantala having a refractive index of about 2.19; the low refractive index material, L, is silica having a refractive index of about 1.45; and layers, T, are thin layers of titania having a refractive index of 2.54. Refractive indices were determined at 600 μm.

| 1 | 110.0 T | 14 | 1137 7 H | 27 | 1801.5 L |
|---|---|---|---|---|---|
| 2 | 917.8 H | 15 | 1987.2 L | 28 | 2386.3 H |
| 3 | 1737.4 L | 16 | 110.0 T | 29 | 1801.5 L |
| 4 | 110.0 T | 17 | 1137.7 H | 30 | 110.0 T |
| 5 | 917.8 H | 18 | 1987.2 L | 31 | 2279.6 H |
| 6 | 1737.4 L | 19 | 110.0 T | 32 | 1801.5 L |
| 7 | 110.0 T | 20 | 1137.7 H | 33 | 110.0 T |
| 8 | 917.8 H | 21 | 1987.2 L | 34 | 2197.4 H |
| 9 | 1737.4 L | 22 | 110.0 T | 35 | 804.7 L |
| 10 | 110.0 T | 23 | 1137.7 H | | |
| 11 | 917.8 H | 24 | 1987.2 L | | |
| 12 | 1737.4 L | 25 | 110.0 T | | |
| 13 | 110.0 T | 26 | 2279.6 H | | |

The interference filter thin film optical coatings of the present invention can be prepared by any of a variety of methods including thermal evaporation, sputtering, solution deposition techniques, such as dip coating, and CVD. As set forth in the foregoing, however, the interference filter thin film optical coatings of the present invention are preferably prepared by a CVD process and, most preferably, by an LPCVD process wherein a suitable metal oxide precursor reagent or reagents for each material of the film is separately introduced into a decomposition chamber wherein it is decomposed or reacted to form the metal oxide on a heated substrate.

The LPCVD process permits application of these coatings onto surfaces having a complex shape and provides good control of thickness. Separate layers of silica and tantala (and titania when employed) are applied onto the substrate in this fashion until the desired filter design is achieved. Such chemical vapor deposition techniques are well known to those skilled in the art and are disclosed in, for example, U.S. Pat. Nos. 4,006,481; 4,211,803; 4,393,097; 4,435,445; 4,508,054; 4,565,747; and 4,775,203, the disclosures of which are herein incorporated by reference.

In forming the metal oxide films on a substrate in accordance with the present invention, the substrate is positioned within a deposition chamber. The chamber is generally contained within a furnace so that the substrate reaches the desired temperature to achieve the reaction or decomposition and concomitant deposition of the metal oxide film on the substrate. These temperatures will generally range between about 350° to 600° C., depending upon the particular reagents used.

For an LPCVD process, the deposition chamber is evacuated and a suitable organometallic precursor of the desired metal oxide in the vapor state is permitted to flow through the deposition chamber by any suitable means. When the reagent flows into the deposition chamber it is decomposed to deposit a metal oxide film on the substrate. When the desired film thickness is achieved the reagent flow is stopped, the chamber evacuated and the reagent for another material is flowed into the deposition chamber until the desired thickness of that material is achieved. The process is repeated until the desired multiple layer interference filter is formed.

Illustrative, but non-limiting examples of compounds suitable for use in the present invention for depositing a silica film by CVD or LPCVD include diacetoxy dibutoxy silane, tetraacetoxy silane, and silicon tetrakis diethyloxyamine. Suitable reagents for,use in the present invention for depositing a film of tantala by CVD or LPCVD include tantalum methoxide, tantalum pentaethoxide, tantalum isopropoxide, tantalum butoxide, mixed tantalum alkoxides, and tantalum pentachloride and water and/or oxygen. Suitable reagents for use in the present invention for depositing a film of titania by CVD or LPCVD include titanium methoxide, titanium ethoxide, titanium propoxide, titanium isopropoxide, titanium butoxide, titanium isobutoxide, and mixed titanium alkoxides.

No carrier gas is required in the deposition chamber to facilitate movement of the reagent(s) through the chamber, although an inert carrier gas can also be employed, if desired as is known in the art. The pressure in the chamber during the deposition process will, in general, range between about 0.1 to 5.0 torr, depending upon the reagent used and the temperature of the substrate. Atmospheric pressure may be employed for a CVD process. The flow rate of the gaseous reagent in the deposition chamber will generally range between about 10–50,000 SCCM, depending upon the size of the reaction chamber, the reagent, presence of a carrier gas and desired rate of deposition, etc.

Individual layers of metal oxide can be uniformly deposited employing this process and layers having a uniformity of film thickness within plus or minus about 2% have been successfully deposited on both flat and curved substrates. Uniform films of tantala, titania, and silica can be formed ranging from about 100 to about 20,000 Å in thickness.

In forming the alternating layers of silica and tantala (and, where appropriate, titania) of the interference filter of the present invention, a layer of tantala or silica will first be deposited and flow of the particular silica or tantala reagent to the chamber will be stopped, the chamber evacuated, and then flow of the reagent which is a precursor or reactant for another film will be introduced into the chamber. The process is repeated until the desired number of layers for the interference filter have been formed.

While not wishing to be held to any particular theory, it is believed heating interference filters according to the invention within the temperature range of 550° to 800° C. results in crystallization of the tantala layers to form a great number of tantala crystallites without significant growth of the individual crystallites and the concomitant formation of the catastrophic stress that results from such crystal growth. Preferably the temperature will be between about 650° to about 675° C., because at temperatures below about 600° C., crystallite formation generally takes an excessively long time and not be commercially feasible. The tantala layer, as deposited by CVD or LPCVD at a temperature of 350° to 550° C., is amorphous and the subsequent heat treatment at 550° to 800° C. is believed to permit the formation of crystallites in an amount sufficient to avoid the formation of the catastrophic stress resulting from the anisotropic growth of the orthorhombic tantala crystallites. The present invention reduces the need for an annealing treatment and, when combined with an annealing treatment, for example, to relieve stress in the silica layers, produces filters with less cracking, lifting, spalling and other stress-related damage.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. An optical interference filter comprising a plurality of alternating layers of tantala and silica in which each tantala layer includes titania in an amount of from about 0.001 to less then 10 mole percent.

2. An optical interference filter according to claim 1 which is produced by a process comprising depositing via chemical vapor deposition said plurality of alternating layers of tantala and silica on a substrate to form a coated substrate, followed by heating the coated substrate to a temperature and for a time effective to crystallize the tantala.

3. The optical interference filter of claim 1 wherein said titania is present in an amount of from greater than about 0.1 to about 10 mole percent.

4. The optical interference filter of claim 1 wherein said titanium is present in an amount from greater than about 0.1 to about 2 mole percent.

5. An electric lamp, comprising a light transmissive vitreous envelope enclosing an electric light source and an optical interference filter produced on the vitreous envelope comprising a plurality of alternating layers of tantala and silica in which each tantala layer includes titania in an amount of from about 0.001 to less than 10 mole percent.

* * * * *